United States Patent
Dögel et al.

(10) Patent No.: US 9,303,744 B2
(45) Date of Patent: *Apr. 5, 2016

(54) TORSIONAL VIBRATION DAMPING ARRANGEMENT

(75) Inventors: Thomas Dögel, Bad Kissingen (DE);
Michael Kühner, Heilbronn (DE);
Ingrid Hoffelner, Knetzgau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 46 days.

This patent is subject to a terminal disclaimer.

(21) Appl. No.: 13/699,945

(22) PCT Filed: Dec. 3, 2010

(86) PCT No.: PCT/EP2010/068823
§ 371 (c)(1),
(2), (4) Date: Nov. 26, 2012

(87) PCT Pub. No.: WO2011/147488
PCT Pub. Date: Dec. 1, 2011

(65) Prior Publication Data
US 2013/0072346 A1    Mar. 21, 2013

(30) Foreign Application Priority Data
May 25, 2010    (DE) .................. 10 2010 029 255

(51) Int. Cl.
*F16H 3/74* (2006.01)
*F16H 35/00* (2006.01)
(Continued)

(52) U.S. Cl.
CPC .............. *F16H 35/00* (2013.01); *F16D 13/38* (2013.01); *F16D 33/18* (2013.01); *F16D 47/06* (2013.01); *F16F 15/131* (2013.01); *F16F 15/13157* (2013.01); *F16F 15/14* (2013.01); *F16F 15/1478* (2013.01); *F16H 45/02* (2013.01);
(Continued)

(58) Field of Classification Search
CPC ....... F16H 35/00; F16H 47/08; F16H 57/006; F16H 45/02; F16H 41/00; F16H 2045/021; F16H 2045/0268; F16H 2045/0205; F16F 15/13157; F16F 15/131; F16F 15/14; F16F 15/1478; H02K 5/24; H02K 7/006; F16D 33/18; F16D 47/06; F16D 13/38
USPC ................ 475/258, 347, 46, 47, 59; 267/136; 192/30 V, 3.31, 70.17, 212, 207, 200, 192/3.21; 60/338, 330; 74/574.2, 574.4
See application file for complete search history.

(56) References Cited

U.S. PATENT DOCUMENTS 4,513,634 A * 4/1985 Ohtsuka ..................... 475/54
6,003,650 A * 12/1999 Kleifges ................... 192/70.17
(Continued)

*Primary Examiner* — David J Hlavka
(74) *Attorney, Agent, or Firm* — Cozen O'Connor

(57) ABSTRACT

A torsional vibration damping arrangement, particularly for a drivetrain with an automatic transmission, includes an input region and an output region, wherein a first torque transmission path and parallel thereto a second torque transmission path and a coupling arrangement for superposing the torques transmitted via the torque transmission paths are provided between the input region and the output region. The torsional vibration damping arrangement further includes at least in the first torque transmission path a phase shifter arrangement for generating a phase shift of rotational irregularities transmitted via the first torque transmission path relative to rotational irregularities transmitted via the second torque transmission path.

23 Claims, 7 Drawing Sheets

(51) Int. Cl.
*F16F 15/14* (2006.01)
*F16H 45/02* (2006.01)
*F16D 47/06* (2006.01)
*F16F 15/131* (2006.01)
*F16H 57/00* (2012.01)
*F16D 13/38* (2006.01)
*F16D 33/18* (2006.01)
*H02K 5/24* (2006.01)
*H02K 7/00* (2006.01)
*F16H 47/08* (2006.01)

(52) U.S. Cl.
CPC ............ *F16H 47/08* (2013.01); *F16H 57/0006* (2013.01); *H02K 5/24* (2013.01); *H02K 7/006* (2013.01); *F16H 2045/021* (2013.01); *F16H 2045/0205* (2013.01); *F16H 2045/0268* (2013.01)

(56) References Cited

U.S. PATENT DOCUMENTS

| | | | | |
|---|---|---|---|---|
| 6,099,434 | A * | 8/2000 | Sasse et al. | 475/347 |
| 6,126,568 | A * | 10/2000 | Sudau | 475/347 |
| 6,231,472 | B1 * | 5/2001 | Sudau et al. | 475/347 |
| 8,608,604 | B1 * | 12/2013 | Jawalkar Nagaraj et al. | 475/47 |
| 8,939,859 | B2 * | 1/2015 | Jawalkar Nagaraj et al. | 475/35 |
| 2002/0033310 | A1 * | 3/2002 | Sasse et al. | 192/3.29 |
| 2005/0146141 | A1 * | 7/2005 | Basteck | 290/44 |
| 2007/0270052 | A1 * | 11/2007 | Basteck | 440/6 |
| 2008/0119316 | A1 * | 5/2008 | Ordo | 475/59 |
| 2011/0124457 | A1 * | 5/2011 | Sung | 475/53 |
| 2011/0124458 | A1 * | 5/2011 | Sung | 475/71 |
| 2011/0124464 | A1 * | 5/2011 | Sung | 475/330 |

* cited by examiner

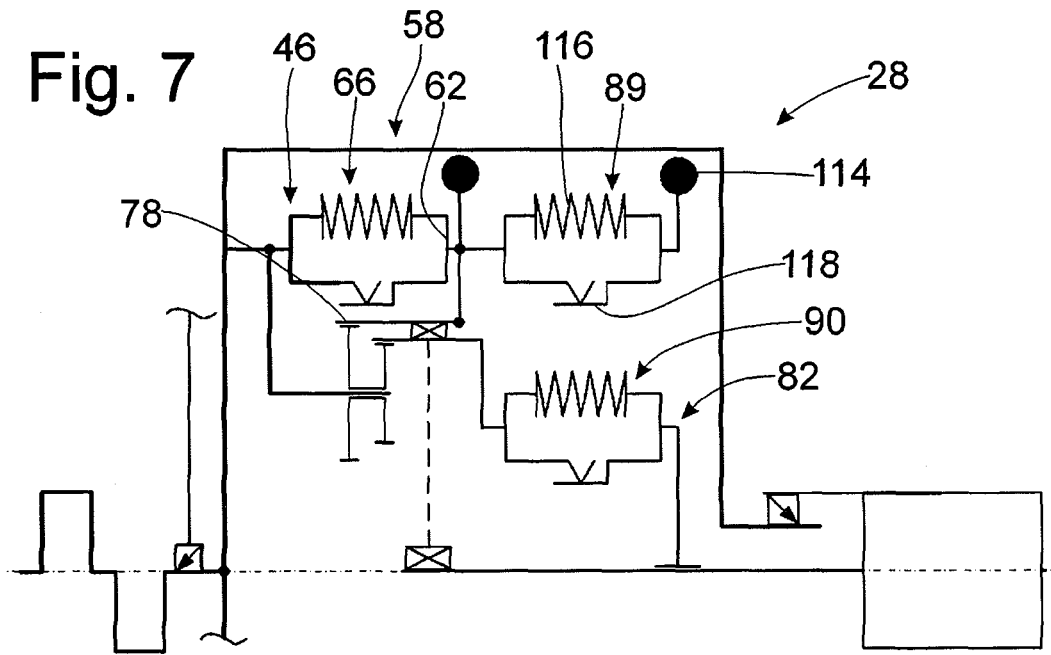
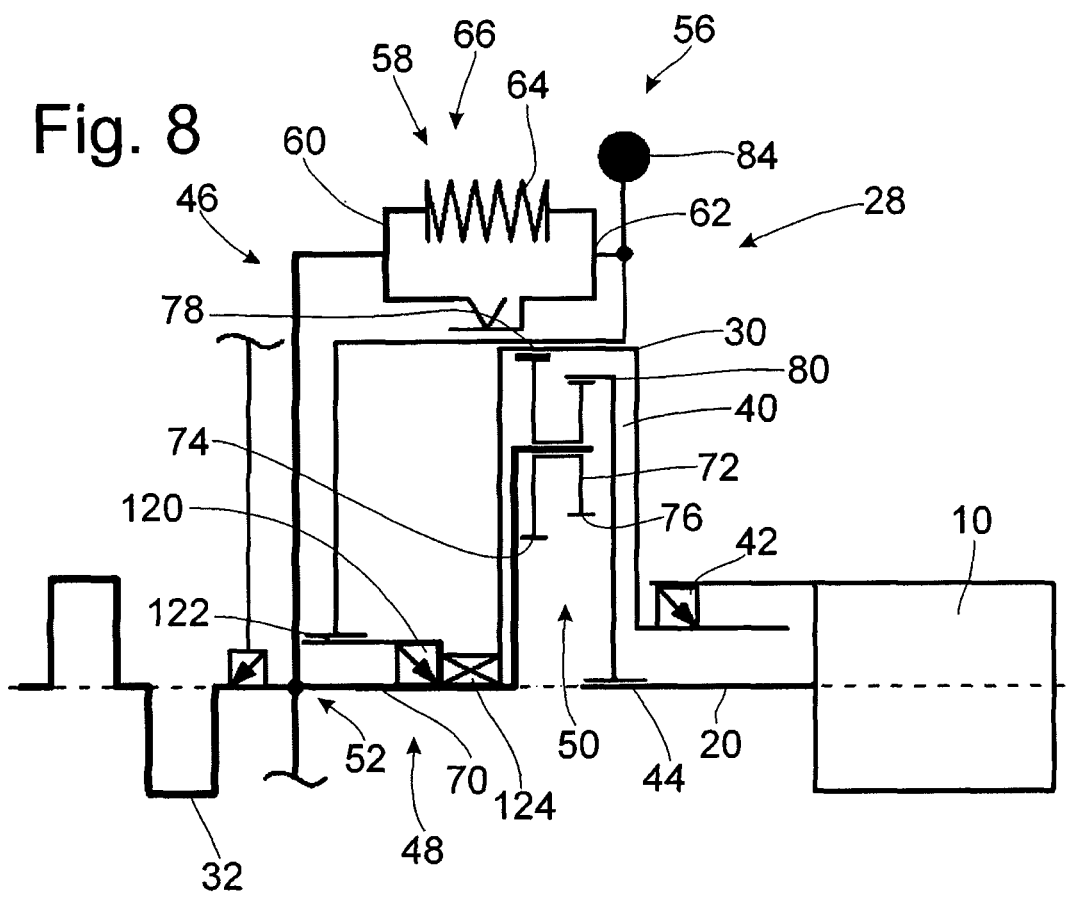

TORSIONAL VIBRATION DAMPING ARRANGEMENT

PRIORITY CLAIM

This is a U.S. national stage of International Application No. PCT/EP2010/068823, filed on 3 Dec. 2011, which claims priority to German Application No. 10 2010 029 255.9, filed 25 May 2010, the contents of which are incorporated herein by reference.

BACKGROUND OF THE INVENTION

1. Field of the Invention

The present invention is directed to a torsional vibration damping arrangement such as can be used, for example, in the drivetrain of a vehicle.

2. Description of the Related Art

Especially in drivetrains constructed with internal combustion engines, a constant torque can generally not be introduced into a drivetrain because periodic ignitions occur in the internal combustion engines and the energy released as a result is converted into a rotational movement of the crankshaft. The torque delivered by the crankshaft and the rotational speed thereof are both subject to fluctuations and oscillations or, generally speaking, rotational irregularities. Because rotational irregularities of this type may be noticeable in driving mode, a general objective is to eliminate these rotational irregularities as far as possible.

For example, it is known to use energy accumulators or energy storages, i.e., for example, springs or moving masses or combinations thereof, to temporarily store the energy occurring in rotational irregularities of the kind mentioned above and then to guide it into the drivetrain in such a way that a smoother speed characteristic or torque characteristic can be achieved. Mass pendulums known as speed-adaptive mass dampers convert the rotational irregularities occurring in driving condition into oscillating deflections of vibrating masses; the deflection is carried out in opposition to centrifugal force and, by predefining the deflection path and the masses to be deflected, it is possible to tune to particular excitation speeds or excitation frequencies. Mass dampers of this type can, of course, be combined with systems of masses which execute oscillations through the use of springs or the like.

Because of the increasingly restricted space availability in modern vehicles, there is also less installation space available for the systems used for vibration damping with consequent loss of decoupling quality, i.e., in the reduction of occurring rotational irregularities.

SUMMARY OF THE INVENTION

It is an object of the present invention to provide a torsional vibration damping arrangement, particularly for a drivetrain with an automatic transmission, which achieves an improved reduction of rotational irregularities introduced into the drivetrain.

According to the invention, this object is met through a torsional vibration damping arrangement, particularly for a drivetrain with an automatic transmission, comprising an input region and an output region. A first torque transmission path and parallel thereto a second torque transmission path and a coupling arrangement for superposing the torques transmitted via the torque transmission paths are provided between the input region and the output region. The torsional vibration damping arrangement further includes at least in the first torque transmission path a phase shifter arrangement for generating a phase shift of rotational irregularities transmitted via the first torque transmission path relative to rotational irregularities transmitted via the second torque transmission path.

In the torsional vibration damping arrangement according to the invention, it is ensured through the use of the phase shifter arrangement that a destructive superposition of oscillation components occurs in the torque to be transmitted in that the transmitted torque is first divided and then recombined by the phase shift that is introduced. Ideally, the rotational irregularities are virtually completely eliminated at least in a particularly critical frequency range.

In order that this phase shift can be achieved efficiently in a structurally simple manner, it is suggested that the phase shifter arrangement includes an oscillation system having a primary side and a secondary side which is rotatable relative to the primary side around the axis of rotation against the force of a spring arrangement.

The phase shifter arrangement is accordingly constructed substantially on the basis of the operating principle of a dual-mass oscillator in which two masses, i.e., essentially the primary side and secondary side, oscillating relative to one another against the action of the spring arrangement are provided with a desired oscillation behavior through selection of spring stiffness on the one hand and of mass ratios and mass inertia at the primary side and secondary side on the other hand. An oscillation system of this kind characteristically has a resonant frequency. In the frequency range below the resonant frequency, an oscillation system of this kind exhibits subcritical oscillations, i.e., excitation and reaction of the system occur substantially simultaneously. When the resonant frequency is exceeded, a phase shift occurs so that excitation and reaction occur substantially out of phase with one another and the system accordingly operates supercritically. This phase shift which ideally has a maximum value of 180° is made use of by the present invention to achieve the desired reduction in rotational irregularities in that the torque oscillation component that is phase-shifted in this way is superposed with the non-phase-shifted torque oscillation component.

To achieve a further improvement in vibration damping behavior in the torque transmission path to the driven member, it is suggested that the output region includes a further oscillation system with a primary side and with a secondary side which is rotatable relative to the primary side against the action of a spring arrangement.

According to a particularly advantageous aspect, it is suggested that a housing arrangement is provided which is rotatable around an axis of rotation, is filled or tillable with fluid, and surrounds at least the coupling arrangement. The integration of at least the coupling arrangement in a housing arrangement which is filled or fillable with fluid makes it possible to reduce wear particularly in the region of the coupling arrangement through the fluid and the lubricating effect brought about by it, particularly when the fluid is oil. Influence can also be exerted on the damping behavior because moving components are to be moved against the resistance of the fluid and energy is dissipated in this way.

It can further be provided that the housing arrangement surrounds at least a portion of the phase shifter arrangement.

In an alternative embodiment, it is suggested that at least a portion of the phase shifter arrangement is arranged outside of the housing arrangement.

In a particularly advantageous aspect of the invention, it is suggested that the torque flow from the housing arrangement and/or input region to a driven member cannot be interrupted.

This means that in contrast to a hydrodynamic torque converter, for example, in which the torque flow can be produced and interrupted selectively by the lockup clutch, the torsional vibration damping arrangement within the meaning of the invention can actually also operate only as such in the torque flow but cannot be used to decouple the area downstream thereof in a drivetrain. In the construction according to the invention, there actually exists between the housing arrangement and the driven member a permanent, indissoluble connection which nevertheless contributes to the damping of torsional vibrations.

For example, the driven member can comprise a driven hub which is coupled or can be coupled to a driven shaft, preferably a transmission input shaft, for common rotation around the axis of rotation.

The supply of fluid to the housing arrangement can be ensured, for example, in that the housing arrangement comprises a drive formation for driving a fluid pump for conveying fluid into the housing arrangement. In this way, a fluid pump can also be activated whenever the housing arrangement is driven in rotation around the axis of rotation, and it is therefore ensured that the housing arrangement is sufficiently filled with fluid during operation.

In an embodiment which is very simple in terms of construction and can be realized in a compact manner, it is suggested that the coupling arrangement comprises a planetary transmission arrangement. To this end, it can be provided, for example, that the planetary transmission arrangement includes a planet gear carrier which is connected to the second torque transmission path and which has a plurality of planet gears rotatably supported thereon. The planet gears can be formed as essentially circular gears, i.e., gears which are toothed around the entire circumference, or alternatively can also be formed as segmented gears.

In order that the planetary transmission arrangement and planet gears thereof can be used in a simple manner for combining the torques or torque components transmitted via the two torque transmission paths, the planetary transmission arrangement includes a first coupling gear arrangement in meshing engagement with the planet gears which is connected to the first torque transmission path and a second coupling gear arrangement in meshing engagement with the planet gears which is connected to the output region.

In this way it can be provided, for example, that the first coupling gear arrangement in connection with the planet gears and the second coupling gear arrangement in connection with the planet gears provide transmission ratios that are identical to one another. By providing substantially identical transmission ratios, the torque components of the total torque to be transmitted which are directed via the two torque transmission paths can be made substantially equal.

The torques or torque components to be transmitted via the two torque transmission paths can be influenced in such a way that they are not equal to one another in that the first coupling gear arrangement in connection with the planet gears and the second coupling gear arrangement in connection with the planet gears provide transmission ratios that differ from one another.

The first coupling gear arrangement and the second coupling gear arrangement can be constructed in each instance as a ring gear arrangement, i.e., can cooperate with the planet gears in the radially outer region thereof. Alternatively, it can be provided that the first coupling gear arrangement and the second coupling gear arrangement each comprise a sun gear arrangement.

To further influence the vibration damping behavior the oscillation system and/or the further oscillation system include(s) at least two vibration dampers arranged in series with one another and respectively comprising a primary side and a secondary side which is rotatable relative to the primary side. Alternatively or in addition, oscillation system and/or the further oscillation system include(s) at least two vibration dampers acting in parallel with one another and respectively comprising a primary side and a secondary side which is rotatable relative to the primary side.

When the oscillation system and/or the further oscillation system comprise(s) a speed-adaptive vibration damping arrangement having at least one deflection mass which can be deflected in circumferential direction from a basic position and which in so doing changes its distance from the axis of rotation, it is further possible to adapt the vibration damping behavior to specific excitation frequencies and orders thereof.

In an alternative embodiment, this can be achieved in that the oscillation system and/or the further oscillation system include(s) a fixed-frequency vibration damping arrangement having at least one oscillation mass which can be deflected against the action of a return spring arrangement.

Further, the vibration damping behavior can be influenced in an advantageous manner in that a friction damping arrangement is associated with the oscillation system and/or with the further oscillation system, which friction damping arrangement opposes a relative rotation between primary side and secondary side thereof.

The present invention is further directed to a drivetrain for a vehicle, comprising an automatic transmission with a transmission input shaft and a torque flow interrupting arrangement internal to the transmission for selectively interrupting the torque transmission connection between the transmission input shaft and a transmission output shaft, further comprising a torsional vibration damping arrangement according to the invention, wherein the output side is coupled with the transmission input shaft for common rotation.

BRIEF DESCRIPTION OF THE DRAWINGS

The present invention will be described in detail in the following with reference to the accompanying drawings.

FIG. 7 is a view corresponding to FIG. 2 of an alternative embodiment.

FIG. 8 is a view corresponding to FIG. 2 of an alternative embodiment.

DETAILED DESCRIPTION OF THE PREFERRED EMBODIMENTS

Figure 1:
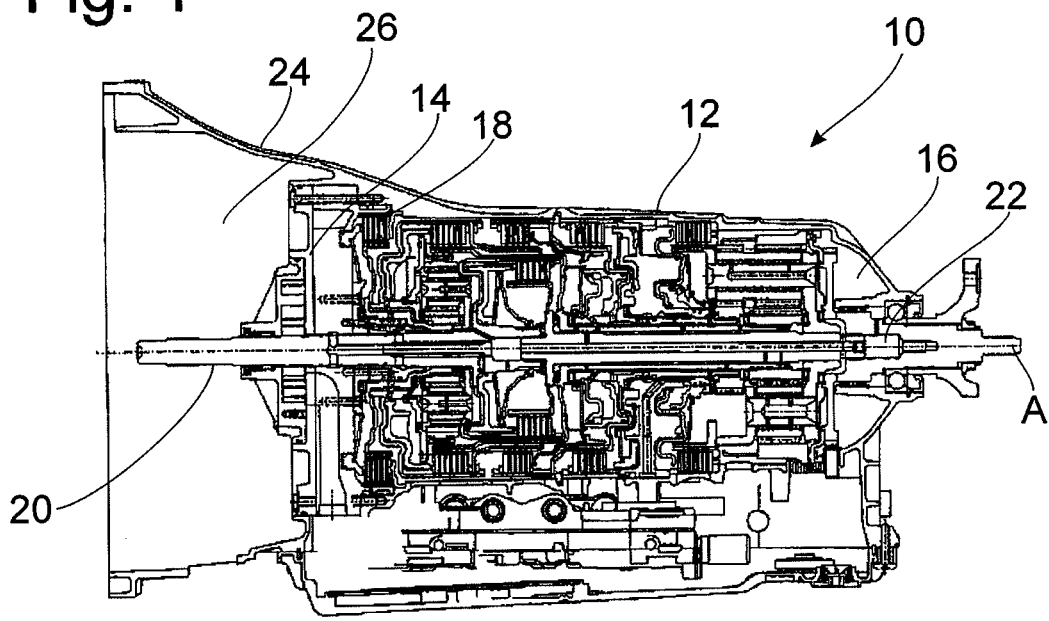
FIG. 1 is a longitudinal sectional view through an automatic transmission.

An automatic transmission provided for the drivetrain of a vehicle is designated generally by 10 in FIG. 1. The transmission 10 comprises a transmission housing 12 with a wet space 16 which is enclosed in a substantially fluid-tight manner by an intermediate plate 14. The various transmission components for changing the speed ratio, i.e., planetary transmission, coupling arrangements, brake arrangements, and the like, are provided in the wet space 16. In particular, these components include a brake arrangement 18 which is arranged in the wet space 16 and which can be used to interrupt the torque flow from a transmission input shaft 20, which is guided through the intermediate plate 14 in a fluid-tight manner, to a transmission output shaft 22. This brake arrangement 18 accordingly operates as a starting element internal to the transmission, by means of which it can be ensured that when the drive unit, e.g., internal combustion engine, is running and the vehicle is stationary the transmission output shaft 22 can be stationary, while the transmission input shaft 20 can rotate with a driveshaft, for example, crankshaft.

When an automatic transmission 10 is constructed in this manner, it is not necessary to provide an additional starting element, i.e., a system such as, e.g., a hydrodynamic torque converter or the like coupling, suitable for selectively producing or interrupting the torque flow. This means in turn that the volume region 26 which is enclosed by a bell housing 24 of the transmission housing 12 and in which the end of the transmission input shaft 20 projecting out of the wet space 16 is also located can be used for arranging a torsional vibration damping arrangement. The housing 12 of the automatic transmission 10 is connected to a drive unit, e.g., an internal combustion engine, by this bell housing 24 so that the torsional vibration damping arrangement is ultimately located and operative in the torque flow between the drive unit or driveshaft thereof and the automatic transmission 10 or transmission input shaft 20 thereof.

In the following, various embodiment forms of torsional vibration damping arrangements are described with reference to FIGS. 2 to 11 which can be used in a particularly advantageous manner according to the principles of the present invention in an automatic transmission 10 such as is shown in FIG. 1.

Figure 2:
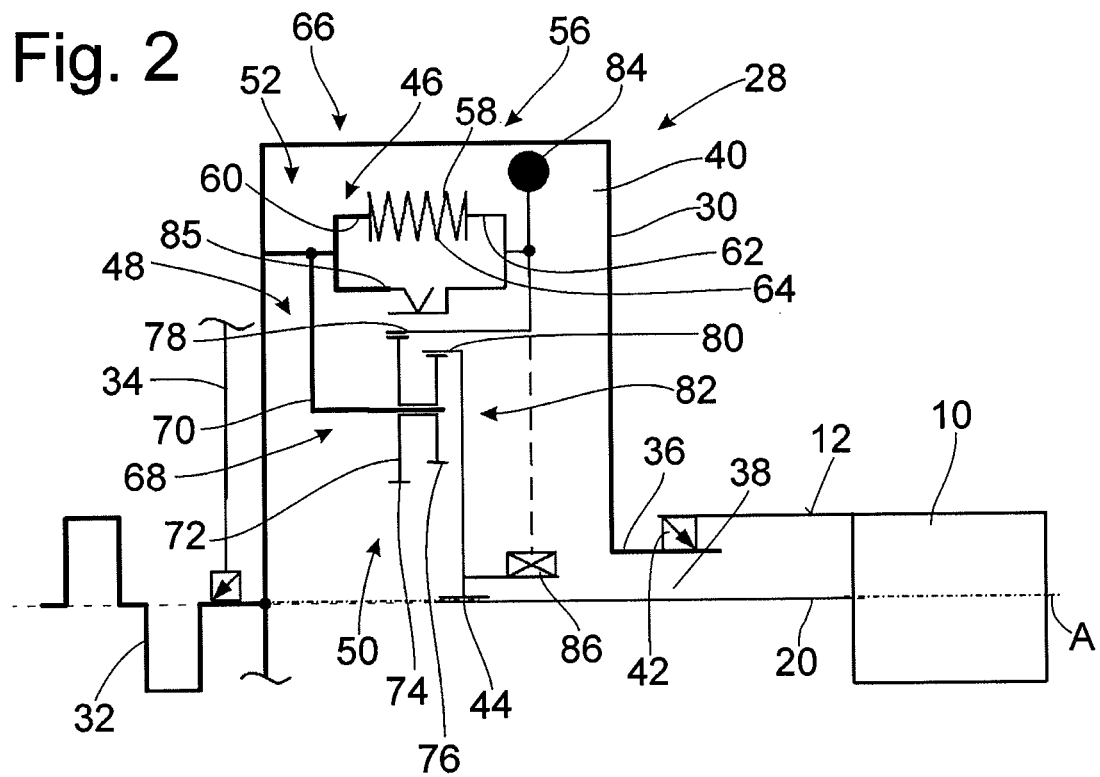
FIG. 2 is a schematic fragmentary longitudinal sectional view through a torsional vibration damping arrangement.

The torsional vibration damping arrangement 28 shown in FIG. 2 comprises a housing 30 which is coupled or can be coupled on the drive side to a driveshaft 32, for example, the crankshaft of an internal combustion engine 34 which is only indicated schematically. By means of this coupling, the housing 30 is rotatable together with this driveshaft 32 around an axis of rotation A which also corresponds, e.g., to the axis of rotation of the transmission input shaft 20.

On the side facing the automatic transmission 10, the housing 30 has a pump drive hub 36 which, for example, projects through the intermediate plate 14 shown in FIG. 1 and drives a fluid pump or transmission oil pump arranged in the wet space 16. Accordingly, this fluid pump which is internal to the transmission can be activated through rotation of the housing 30 similar to a hydrodynamic torque converter, and fluid can be conveyed through an intermediate space 38 formed, for example, between the transmission input shaft 20 and the pump drive hub 36, into the interior 40 of the housing 30 and also removed again therefrom. In this case, it is not necessary, for example, to provide bores in the transmission input shaft 20 for supplying the interior 40 as is the case, for example, in a hydrodynamic torque converter. Also, it is not necessary to provide a hollow supporting shaft such as is provided, for example, for a stator of a hydrodynamic torque converter. The dynamic sealing between the wet space 16 and the volume region or interior 26 enclosed by the bell housing 24 is carried out by means of a seal system 42 which acts between the transmission input shaft 20 and the intermediate plate 14 and between the intermediate plate 14 and the pump drive hub 36.

The torsional vibration damping arrangement 28 comprises a driven member 44 in the interior 40 of the housing 30. The driven member 44 is coupled or can be coupled, for example, by toothed engagement, with the transmission input shaft 20 for common rotation with the latter. Between the housing 30 and the driven member 44, there are two torque transmission paths 46, 48 which are guided together in the area of a coupling arrangement 50 upstream of the driven member 44 constructed as driven hub and branch in an input region 52. The input region 52 is fixedly coupled to the housing 30 so that the torque flow from the housing 30 into the input region cannot be interrupted.

The two torque transmission paths 46, 48 branch out in the input region 52. The first torque transmission path 46 thereof comprises a phase shifter arrangement 56 which causes the torque transmitted via this first torque transmission path 46 to undergo a phase shift relative to the torque transmitted via the second torque transmission path 48.

The phase shifter arrangement 56 includes a torsional vibration damper 58 having a primary side 60, a secondary side 62 and a spring unit 64 which opposes a relative rotation between the primary side 60 and the secondary side 62. The torsional vibration damper 58 can be constructed in a conventional manner and, for example, can comprise as primary side a hub disk and as secondary side two cover disk elements which are disposed on either side thereof and which are fixedly connected to one another. The spring unit 64 can have a plurality of springs, preferably helical compression springs, which are disposed successively in circumferential direction and which, being supported at the primary side 60 and secondary side 62, cause a restoring force thereof with respect to one another in direction of a neutral relative rotational position. Accordingly, in the embodiment example shown in FIG. 1, the torsional vibration damper 58 substantially provides an oscillation system 66 which leads in the first torque transmission path 46 to a phase shift of rotational irregularities or torque oscillations transmitted via this first torque transmission path 46. This oscillation system 66 has a natural frequency or resonant frequency as a result of the masses present at the primary side and secondary side 62 and the spring unit 64 of the torsional vibration damper 58 which provides the spring arrangement of the oscillation system 66 in this case. When vibrations are excited below this natural frequency, vibrations which are to be transmitted are transmitted substantially without a phase shift. When the resonant frequency is exceeded, a phase shift occurs which ideally and at most can amount to 180° so that exciting vibrations and transmitted vibrations are out of phase with one another.

The torques or torque components transmitted via the two torque transmission paths 46, 48 are combined again in the coupling arrangement 50. To this end, the coupling arrangement 50 is constructed as a planetary transmission arrangement 68 and comprises a planet gear carrier 70 coupled to the first torque transmission path 48. This planet gear carrier 70 carries a plurality of planet gears 72 distributed in circumferential direction. These planet gears 72 have two sets of teeth 74, 76 which are axially offset with respect to one another and which in the embodiment example shown in FIG. 1 have diameters which differ from one another with respect to the rotational axes of the planet gears 72 at the planet gear carrier 70.

A first ring gear 78 is connected to the secondary side 62 of the torsional vibration damper 58 and oscillation system 66, respectively, and is in meshing engagement with the teeth 74 of the planet gears 72. A second ring gear 80 which substantially also provides an output region 82 of the torsional vibration damping arrangement 46 is in a toothed engagement with the teeth 76 of the planet gears 72. The second ring gear 80 is fixedly connected to the driven member 44 so that the torque flow can also not be selectively interrupted or produced in the output region 82, i.e., between the coupling arrangement 50 and the driven member 44, but rather is permanently established. This also applies to the region of the torsional vibration damping arrangement 28 located between the branching in the input region 52 and the joining of the two torque transmission paths 46, 48 in the region of the coupling arrangement 50. The secondary side 62 and the ring gear 78 coupled therewith can be supported at the output region 82, for example, by a bearing 86.

Through cooperation of the planet gears 72 with the two ring gears 78, 80, these planet gears 72 being carried on the planet gear carrier 70 so as to be basically freely rotatable, the planetary transmission arrangement 68 causes the torques transmitted via the two torque transmission paths 46, 48 to be combined. When these torques contain oscillation components and if the frequency of these oscillation components or fluctuation components is below the resonant frequency of the oscillation system 66, the two torques or torque components are combined and superposed in phase in the coupling arrangement 50. The torque transmitted into the output region 82 accordingly also approximately corresponds with respect to its fluctuation characteristic to the torque received in the input region 52 of the lockup clutch 54.

However, if the frequency of the oscillation component lies above the resonant frequency of the oscillation system 66, i.e., of the torsional vibration damper 58 in this instance, the two torques transmitted with their oscillation components via the torque transmission paths 46, 48 are destructively superposed in the coupling arrangement 50. Ideally, i.e., with a phase shift of 180°, the oscillation components can be completely eliminated so that the torque received at the output region 82 has a substantially smooth characteristic or at least a characteristic with appreciably reduced oscillation.

To further influence the damping behavior of the torsional vibration damping arrangement 42, a supplementary mass 84 can be associated, for example, with the secondary side 62 so as to increase the mass on the secondary side and therefore exert an influence on the resonant frequency. Further, a friction damping arrangement, designated generally by 85, can be associated with the oscillation system 66. Friction damping arrangement 85, for example, can act parallel to the spring unit 64 between the primary side 60 and the secondary side 62 and can be configured as a Coulomb friction device or as a fluid friction device. Providing a friction damping arrangement 85 of this type acting in parallel with the spring unit 64 also substantially influences the magnitude of the phase shift introduced by the oscillation system 66.

The configuration of the torsional vibration damper 58, (i.e., the mass at the primary side 60, the mass at the secondary side 62; the stiffness of the spring unit 64, and the supplementary mass 84 reinforcing the secondary-side mass) generally aims for the lowest possible natural frequency of the oscillation system 66 in order to achieve the transition to the supercritical operating condition, i.e., the operating condition working with phase shift, already at comparatively low excitations of oscillation, i.e., already at a comparatively low rotational speed.

Due to the fact that the two sets of teeth 74, 76, and therefore also the two ring gears 78, 80, have different diameters, it is possible to exert an influence on the distribution of torques to the two torque transmission paths 48, 48. The closer the diameters of the ring gears 78, 80 to one another, and therefore the closer the diameters of the sets of teeth 74, 76 to one another, the more uniform the components of the torques transmitted via the two torque transmission paths 46, 48. In the embodiment example shown in FIG. 1 in which the teeth 74 cooperating with the ring gear 78 have a greater diameter, a transmission ratio below 1 is achieved; with the reverse size ratio, a transmission ratio above 1 is achieved. In the former case, the torque transmitted via the first torque transmission path 46 is increased by making use of a torque flow reversal in the second torque transmission path 48, namely, by supporting at the coupling arrangement 50. In this case also, within the meaning of the invention, a destructive superposition of the two torque flows in the torque transmission paths is used to obtain a substantially smoother total torque at the output region 82. In the latter case, i.e., when teeth 76 are larger and teeth 74 are smaller, the torque introduced at the input region 52 is divided corresponding to the size ratios in such a way that a torque flow is carried out in the same direction in both torque transmission paths 46, 48 and the two torque components guided in the same direction are superposed on one another in the coupling device 50.

By providing the torsional vibration damping arrangement 28, shown in FIG. 2, as closed system, i.e., by providing a volume which is substantially enclosed by the housing 30, it is possible to protect the different system areas contributing to the damping of torsional vibrations from excessive wear by means of the fluid present in the housing 30 during operation. This chiefly concerns the coupling arrangement 50 and planetary transmission arrangement 68 in which the two torque components transmitted via the torque transmission paths 46, 48 are guided together. The movement, e.g., of the planetary transmission arrangement 68 and also of the torsional vibration damper 58 in the fluid, which is generally to be considered as a viscous medium, also influences the damping behavior because energy is dissipated due to the necessity of displacing fluid.

This type of construction of the torsional vibration damping arrangement 28 is suitable above all in connection with an automatic transmission because the supply of fluid to the interior 40 can be ensured in this way. In so doing, a transmission control device which can actuate different valves in order to release or interrupt the flow path to the interior 40 of the housing 30 can be provided in the housing 12 of the automatic transmission 10, particularly also in the wet space 16. In so doing, the fluid is removed from the fluid sump in the housing 12 and returned to the latter again by the pump which is driven by the housing 30 itself.

Figure 3:
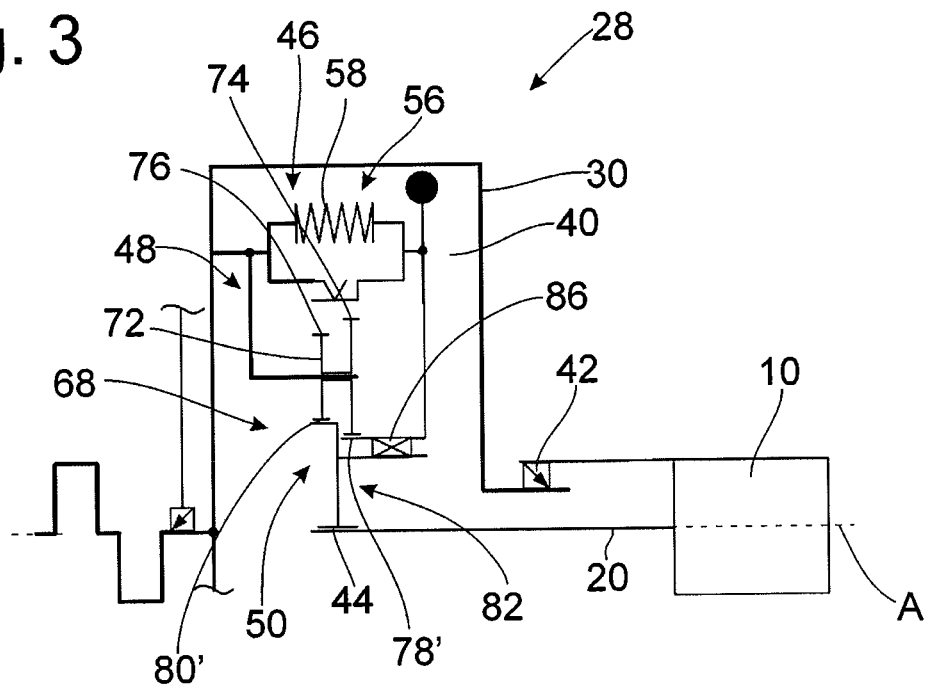
FIG. 3 is a view corresponding to FIG. 2 of an alternative embodiment.

FIG. 3 shows a modified embodiment form in which the planetary transmission arrangement 68, i.e., the coupling arrangement 50, comprises a sun gear 78' and sun gear 80' for cooperating with the two sets of teeth 74, 76 of stepped planet gears 72. These sun gears 78', 80' are arranged in this case radially inwardly of the planet gears 72, which are arranged so as to be distributed in a circumferential direction around the axis of rotation A sun gear 78', 80' lead to the superposition of the torque components transmitted into the two torque transmission paths 46, 48 and to the further transmission of the total torque achieved by the superposition into the output region 82 and driven member 44.

Figure 4:
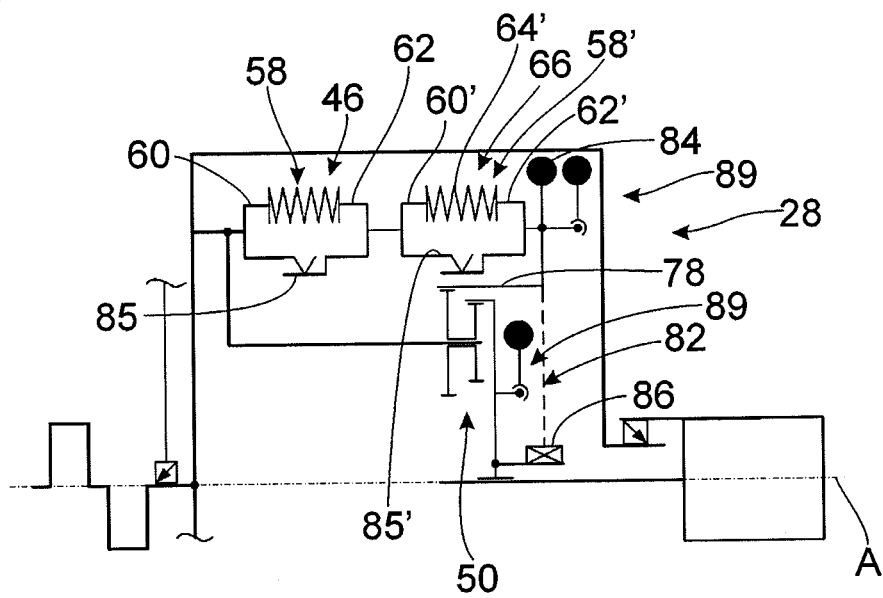
FIG. 4 is a view corresponding to FIG. 2 of an alternative embodiment.

In the embodiment form shown in FIG. 4, the oscillation system 66 comprises two torsional vibration dampers 58, 58' which are connected in series in this case. With its primary side 60, torsional vibration damper 58 substantially also forms the primary side 60 of the oscillation system 66. Its secondary side 62 is connected to the primary side 60' of the second torsional vibration damper 58'. The secondary side 62' of the latter substantially also forms the secondary side of the oscillation system 66 and is coupled with the ring gear 78 and also with the additional flywheel mass 84. As is the case with torsional vibration damper 58, a friction damping arrangement 85' can also be provided in torsional vibration damper 58' and can act in parallel with the spring unit 64' thereof.

It is to be noted here that, of course, the two torsional vibration dampers 58 and 58' could also work in parallel in this case. To this end, the two primary sides 60 and 60' are to be fixedly coupled to one another, while the secondary sides 62 and 62' are likewise to be coupled with one another so that the two spring units can act in parallel with one another.

It will be seen in this embodiment that alternatively or in addition to the additional flywheel mass 84 a vibration damping arrangement 89 is provided at the secondary side 62' of the second torsional vibration damper 58'. This vibration damping arrangement 89 can be constructed as a speed-adaptive mass damper with one or more deflection masses which can be deflected along respective guide paths extending in a circumferential direction. These guide paths have vertex regions in which they are at the greatest distance from the axis of rotation A. When the deflection masses are deflected out of these vertex regions, they not only move in the circumferential direction but are also guided radially inward so that they absorb potential energy. It is possible by means of the geometry of these guide paths and by the selection of masses of the deflection masses to tune to an exciting oscillation or higher orders, for example, to the firing frequency. Alternatively, it would also be possible to configure a vibration damping arrangement 89 of this kind as a fixed-frequency mass damper. One or more flywheel masses can be provided for this purpose. These flywheel masses can deflect against the return force of springs so that, through the selection of the masses on the one hand and the selection of spring constants on the other hand, it is possible to tune to a frequency to be damped.

As is shown in FIG. 4, it is possible alternatively or in addition to provide a vibration damping arrangement 89 of this kind also at the output region 82, for example, coupled to the ring gear. Of course, the vibration damping arrangement 89 integrated in the first torque transmission path 46 could also be coupled to the ring gear 78. Further, it is noted that vibration damping arrangements 89 of this kind which operate in a speed-adaptive manner or as fixed-frequency mass dampers can also be provided in any of the other embodiment forms illustrated herein, namely, so as to be associated with one of the torque transmission paths 46, 48 and also in association with the output region 82.

Figure 5:
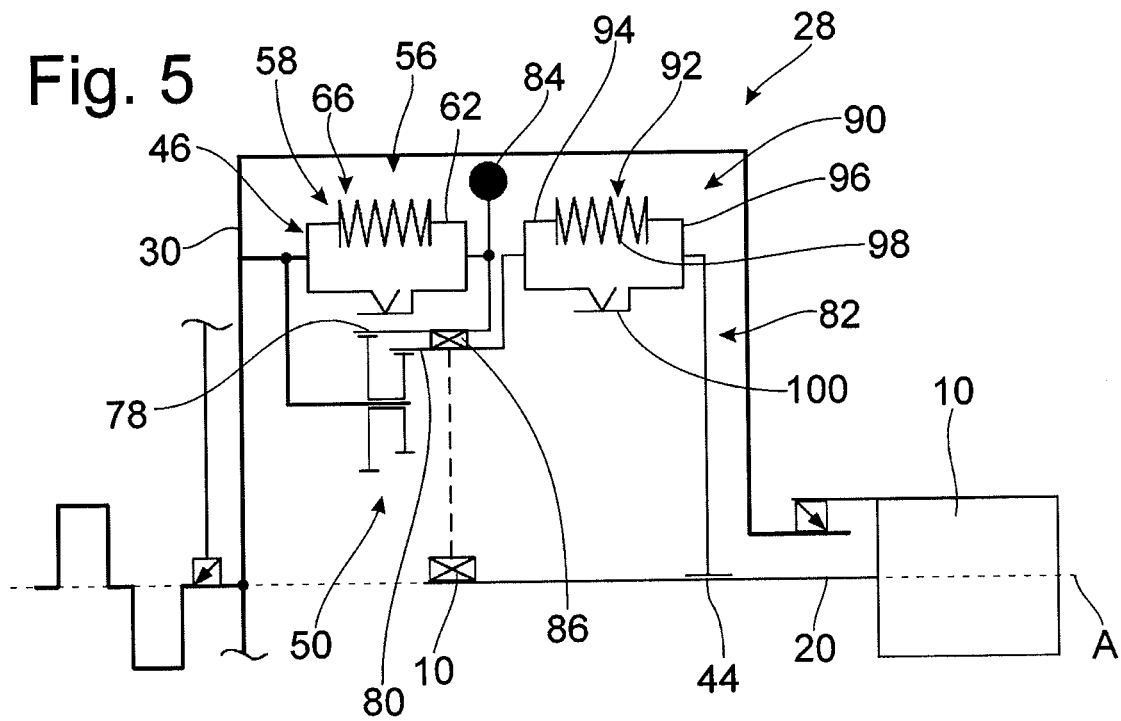
FIG. 5 is a view corresponding to FIG. 2 of an alternative embodiment.

In the construction shown in FIG. 5, in addition to the oscillation system 66 of the phase shifter arrangement 56, which oscillation system 66 works in the first torque transmission path 46, a further oscillation system 90 is associated with the output region 82. The further oscillation system 90 lies in the torque flow between the housing 30 and the driven member 44 downstream of the coupling arrangement 50. The further oscillation system 90 comprises a torsional vibration damper 92 with a primary side 94 which is coupled to the output-side ring gear 80 and a secondary side 96 which is coupled to the driven member 44. A spring unit 98 acts between the latter so that the primary side 94 and the secondary side 96 can rotate in a circumferential direction around the axis of rotation A relative to one another and against the return action of the springs of the spring unit 92. A friction damping arrangement 100 can act parallel to the spring unit 98 in this case also.

A bearing 86 is provided between the primary side 94 of this further oscillation system 90 and ring gear 80 coupled thereto and the secondary side 62 of the oscillation system 66 and ring gear 78 coupled thereto. Further, additional support can be carried out with respect to the transmission input shaft 20 by a bearing 102.

A substantial advantage of this embodiment is that between the two oscillation systems 66, 90 which act in series in this case, a comparatively inert intermediate mass is achieved by means of the supplementary mass 84 between the two oscillation systems 66, 90, which proves very advantageous with respect to the vibration damping characteristic. Since the total torque transmitted via the torsional vibration damping arrangement 28 is to be transmitted in every case via the further oscillation system 90, the spring unit of the further oscillation system 90 should be designed in such a way that it can transmit this torque within the range of its elasticity, i.e., without a blocking of rotation between the primary side 94 and the secondary side 96 in the entire torque range.

Of course, the additional flywheel mass 84, for example, can also act at a different position as an intermediate mass. For example, coupling to the primary side 94 of the torsional vibration damper 92 or directly to the ring gear 78 could also be carried out.

Figure 6:
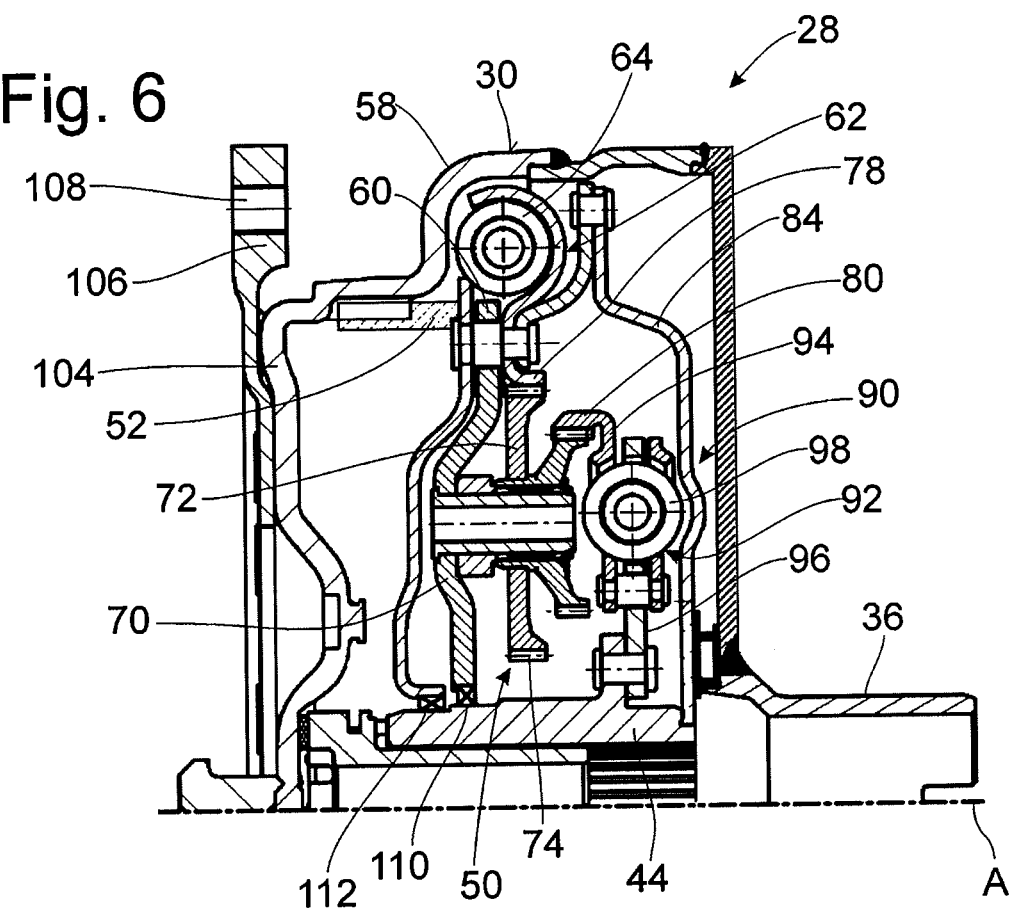
FIG. 6 is a fragmentary longitudinal sectional view through a torsional vibration damping arrangement corresponding to the construction principle in FIG. 5.

FIG. 6 shows an embodiment of the construction principle shown in FIG. 5. The housing 12 of the torsional vibration damping arrangement 58 is seen to comprise a plurality of housing parts or housing shells and has the pump drive hub 36 for engaging in the wet space 16 of the automatic transmission 10. A coupling unit 106 is provided at a housing shell 104 that is to be positioned facing the drive unit. The coupling unit 106 can be plate-shaped or annular disk-shaped and has a plurality of coupling portions 108, for example, for screwing to a flexplate, or the like, which is to be connected in turn in its radially inner region to the drive shaft 32, for example, by screws. In this way, the housing 12 can be driven in rotation around the axis of rotation A.

The input region 52 is coupled, e.g., by a spline connection, to the housing 12 so as to be fixed with respect to rotation relative to it and is connected with the primary side 60 of the torsional vibration damper 58, which primary side 60 is provided, for example, by a hub disk or a central disk element. In its radially inner region, this central disk element simultaneously also forms the planet gear carrier 70 at which a plurality of planet gears 72 are supported so as to be distributed in circumferential direction rotatably around the axis of rotation by corresponding arbor-like bearing pins. In this case, the planet gear carrier 70 is rotatably supported on the driven member 44 by a bearing 110. The secondary side 62 which is provided in this case by two cover disk elements can also be rotatably supported on the driven member 44 in the region of a cover disk element, in this case, the drive-side cover disk element, and by a bearing 112. In this embodiment form, the planet gear carrier 70 could also be connected directly to the housing 30, for example, the housing shell 104 facing the drive unit. For this purpose, through-recesses can be provided in the radially inwardly projecting cover disk element of the secondary side 62, and corresponding fastening portions of the planet gear carrier 70 can protrude through these through-recesses so as to also allow movement in a circumferential direction relative to this secondary side 62.

The other cover disk element of the two cover disk elements of the secondary side 62 forms in its radially inner region the ring gear 78 cooperating with the larger-diameter teeth 74 of the planet gears 72.

The further oscillation system 90 and torsional vibration damper 92 thereof form the ring gear 80 with one of the cover disk elements of the primary side 94 thereof. A central disk element acting as secondary side 96 is connected radially inwardly to the driven member 44 by riveting or the like, but could also be formed integral with it.

The supplementary mass 84 comprises in this instance two annular disk-shaped mass parts made of sheet metal material or cast material, for example. One of these parts is connected by riveting to the secondary side 62, i.e., the two cover disk elements thereof, and is connected in its radially outer region to the other part by riveting. This other part is in turn guided radially inward and is supported, for example, axially with respect to the housing 12 and also radially with respect to the driven member 44.

FIG. 7 shows a construction which basically corresponds to the construction described above with reference to FIG. 5. The two oscillation systems 66 and 90 are also seen in this case, the former being integrated in the first torque transmission path 46, while the latter is associated with the output region 82. Also seen here is the construction of an additional vibration damping arrangement 89 as a fixed-frequency mass damper. Mass 114 is provided, for example, by one or more mass parts. One or more springs 116 couple this mass 114 to the secondary side 62 of the torsional vibration damper 58 and ring gear 78. A friction damping arrangement 118 can act in parallel with the spring or springs 116 so that an additional dissipation of energy can be realized.

What is essential in additional vibration damping arrangements of this kind is that, regardless of whether they are formed as fixed-frequency mass dampers or as speed-adaptive mass dampers, they do not lie in the torque transmission path but rather comprise masses which oscillate essentially without torque load.

In the embodiment example shown in FIG. 8, the oscillation system 66 and therefore the phase shifter arrangement 56 are arranged outside of the housing 30. The input region 52 is coupled to the driveshaft 32 for common rotation therewith. The torsional vibration damper 58 can be arranged in such a way, for example, that the springs of its spring unit 64 radially surround the housing 30 and axially overlap with the latter.

The planet gear carrier 70 of the second torque transmission path 48 projects into the interior 40 of the housing 30 and is guided through a seal arrangement 120 so as to be fluid-tight but rotatable into the housing 30. The housing 30 can be coupled to the secondary side 62 of the torsional vibration damper 58 so as to be fixed with respect to relative rotation, for example, by a spline connection 122. Further, the housing 30 can be supported on the planet gear carrier 70 by a bearing 124. Because the housing 30 is supported with respect to the planet gear carrier 70 by bearing 124 and is therefore held radially in a substantially defined manner, it is ensured that a substantially constant seal gap is provided in the seal arrangement 120.

The torque component transmitted by the phase shifter arrangement 56 arrives in the housing 30 via the secondary side 62 and the spline connection 122. This housing 30 either itself forms the ring gear 78 or is fixedly connected to it. The torque components are guided together by the planet gears 72, which in turn each have the two sets of teeth 74, 76, and are conveyed further via the ring gear 80 to the driven member 44 and therefore to the transmission input shaft 20.

In order to ensure a fluid-tight enclosure of the interior 40 in this embodiment, the seal arrangement 120 positioned on a smaller radius than seal arrangement 42 is movable relative to the first seal arrangement. The interior 40 of the housing 30 is supplied with fluid in the manner described above. By means of the defined and controlled supply of fluid into the interior 40, it is further ensured that the sealing surfaces of the seal arrangement are substantially not wetted by fluid during driving operation or in stationary condition. In the stationary state, the housing 30 will empty until the filling level is below the seal arrangement 120. In the driving state, the fluid primarily displaces radially outward due to centrifugal force so that there is also substantially no wetting of the seal arrangement 120 in this state.

Accordingly, in this embodiment form the action of the fluid is used only in the region of the coupling arrangement 50 for reducing wear and also as an additional damping component.

Figure 9:
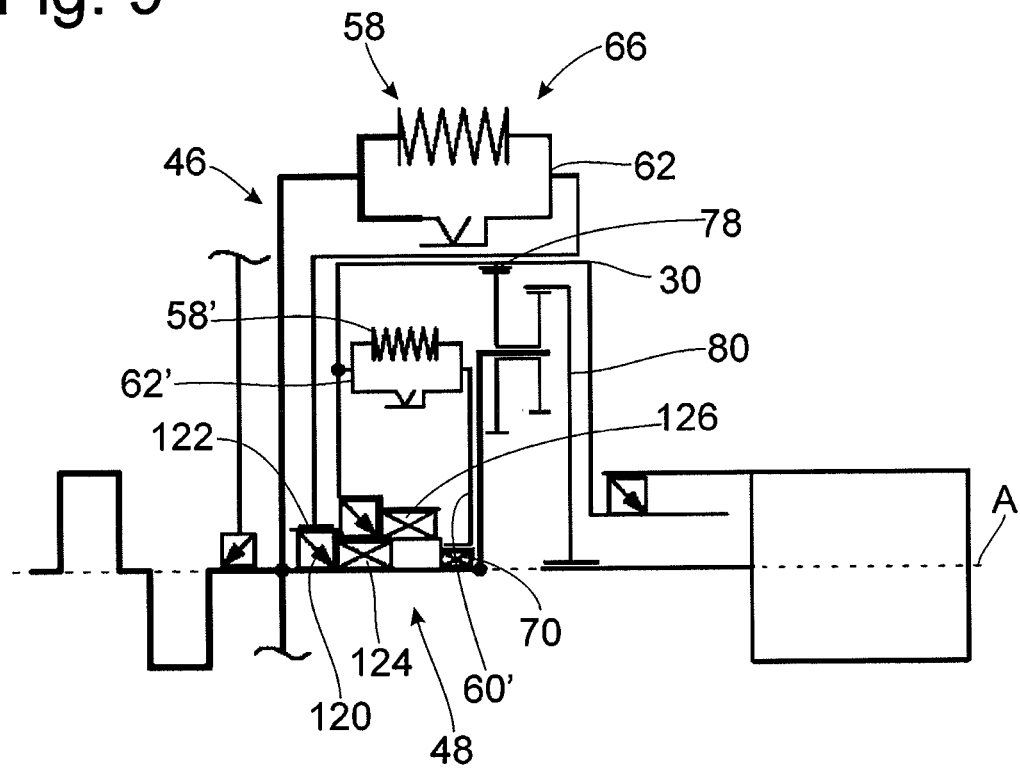
FIG. 9 is a view corresponding to FIG. 2 of an alternative embodiment.

In the construction shown in FIG. 9, the oscillation system 66 again comprises two torsional vibration dampers 58, 58', the first of which lies outside of the housing 30 in a manner corresponding to FIG. 8, while the second torsional vibration damper 58' lies within the housing 30 but in the first torque transmission path 46 at the same time. Further, the secondary side 62 of the first torsional vibration damper 58 is now connected by means of the above-mentioned spline connection 122 to the primary side 60' of the torsional vibration damper 58' located in the housing 30. The secondary side 62' of the torsional vibration damper 58' thereof is connected to the housing 30 itself, which in turn carries the ring gear 78 or itself provides the latter.

In this embodiment example, the primary side 60' of the torsional vibration damper 58' is supported on the planet gear carrier 70 and therefore on the second torque transmission path 48 by the bearing 124. The housing 30 is supported on the primary side 60' of the torsional vibration damper 58' by another bearing 126. In this case, the primary side 60' of the second torsional vibration damper 58' can be formed as intermediate shaft or can be connected to the latter.

In this case also, the seal arrangement 120 through which the housing 30 is connected in a fluid-tight manner with respect to the planet gear carrier 70 lies comparatively far radially inward with respect to the axis of rotation A so that, taking into account the filling level adjusting itself in driving operation and in the stationary state, a wetting of the sealing surfaces thereof can be extensively eliminated.

Figure 10:
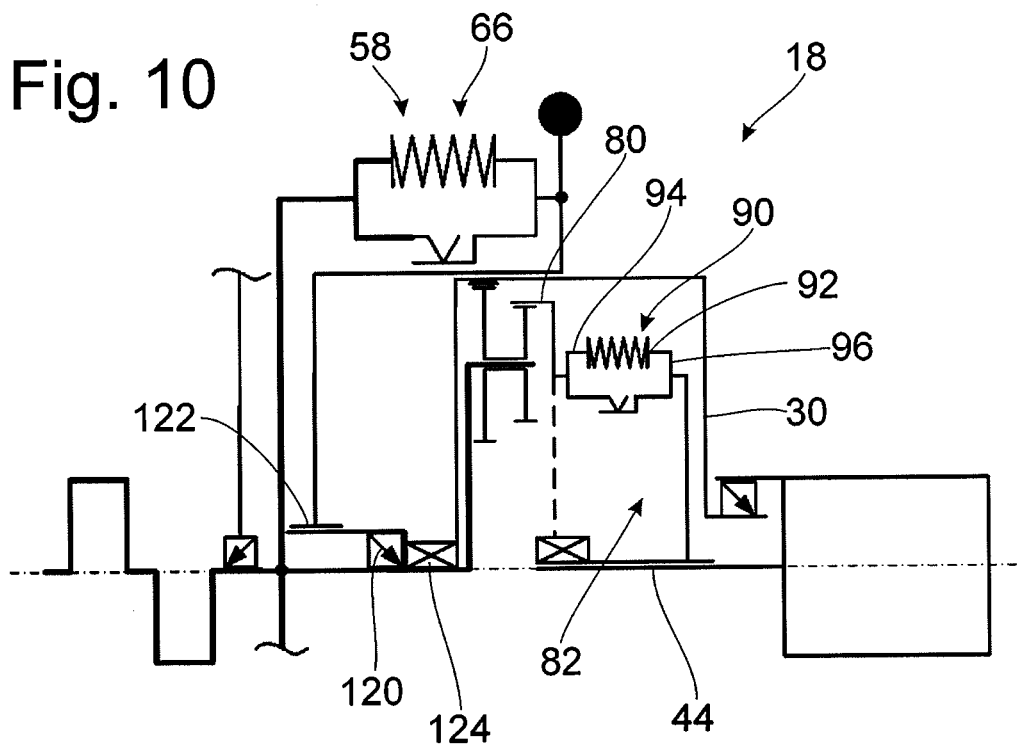
FIG. 10 is a view corresponding to FIG. 2 of an alternative embodiment.

FIG. 10 shows a construction which is essentially a combination of the embodiment variant according to FIG. 8 and the embodiment variant according to FIG. 5. The oscillation system 66 and the torsional vibration damper 58 thereof are arranged outside of the housing 30, for example, so as to substantially surround it radially outwardly. The further oscillation system 90 with its torsional vibration damper 92 lies downstream of the ring gear 80 in the output region 82. Its secondary side 96 is coupled to the driven member 44.

Figure 11:
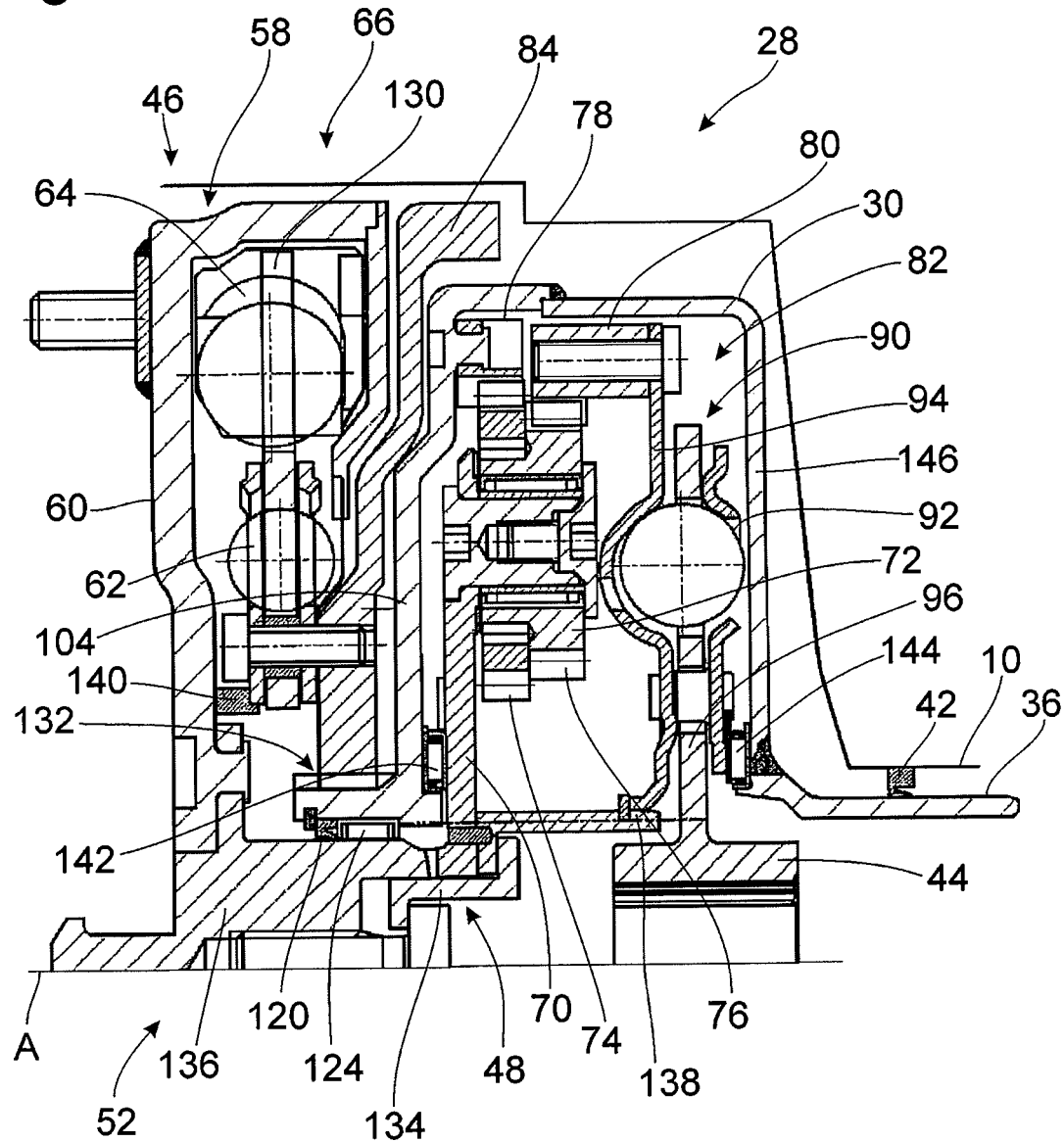
FIG. 11 is a fragmentary longitudinal sectional view through a torsional vibration damping arrangement corresponding to the construction principle in FIG. 10.

FIG. 11 is a fragmentary longitudinal sectional view through an embodiment of the construction principle explained above referring to FIG. 10. The torsional vibration damper 58 and primary side 60 thereof are formed with two cover disk elements which are arranged at a distance from one another axially. One of these two cover disk elements which is positioned on the drive side can be coupled by a flexplate or the like to a driveshaft, for example, a crankshaft of a drive unit, for common rotation around the axis of rotation A.

The torsional vibration damper 58 is constructed in two stages in this case. A first stage comprises the two cover disk elements mentioned above as input region or primary side and a central disk element 130 as secondary side or output region. This central disk element 130 is rotatable with respect to the two cover disk elements around the axis of rotation A by means of a first spring set of the spring unit 64 and at the same time in its radially inner region also forms the input region or primary side of a radially inner second damper stage. This damper stage acts in series with the first damper stage and includes two additional cover disk elements as output side or secondary side, which also provides the secondary side 62 of torsional vibration damper 58 at the same time. These additional cover disk elements are arranged at both sides of the central disk element 130 and can be connected, e.g., screwed, to a supplementary mass 84 which is disk-shaped in the present case. Another spring set of the spring unit 64 of torsional vibration damper 58 acts between these two additional cover disk elements and the central disk element 130 and accordingly allows a relative rotation of these two system areas with respect to one another.

Radially inwardly, the supplementary mass 84 is in rotational coupling engagement with the housing 30 and a drive-side housing shell 104 thereof by means of teeth 132. The ring gear 78 in meshing engagement with the teeth 74 of the planet gears 72 is fastened, e.g., riveted, to this housing shell 104 radially outwardly.

The planet gear carrier 70 supporting the planet gears 72 is connected to an input hub 136 radially inwardly, for example, by means of a Hirth joint, and using a clamping sleeve 134. This input hub 136 is in turn fixedly connected to the primary side 60 of the torsional vibration damper 58 so that a branching into the two torque transmission paths 46 and 48 takes place in the region of this drive hub 136.

The ring gear 80 which is in meshing engagement with the teeth 76 of the planet gears 72 is fixedly connected to the primary side 94 of the torsional vibration damper 90, for example, by screwing, riveting or in some other way. This primary side 94 comprises two cover disk elements which are fixedly connected to one another at an axial distance from one another, and a central disk element of the secondary side 96 is received therebetween. This central disk element is fixedly connected to the driven member 44, for example, by welding, riveting or the like or, as is shown in the present case, is formed integral with it. The primary side 94 of the torsional vibration damper 90 is supported radially relative to the planet gear carrier 70 and, therefore, also relative to the input region 136 by a sleeve-like bearing element 138 which is connected, for example, together with the planet gear carrier 70, to the drive hub 136. An axial misalignment between the rotation axis of a driving shaft and the rotation axis of a driven shaft which is to be coupled to the driven member 44 can be compensated by the radial relative movability of the secondary side 96 with respect to the primary side 94 of the torsional vibration damper 90.

An axial bearing support of the secondary side 62 of the torsional vibration damper 58, i.e., of the cover disk elements provided in the second damper stage, relative to the primary side 60 of the torsional vibration damper can be carried out, for example, directly via a bearing element 140 shown in FIG. 11. A radial bearing support of the secondary side 62 of the torsional vibration damper 58 can be realized by the toothed engagement of the supplementary mass 84 with the housing 30, and the bearing support of the housing 30 on the input hub 136 can be realized by means of bearing 124. The planet gear carrier 70 is axially supported with respect to the housing 30 by a bearing 142. In the other axial direction, this is supported by the bearing element 138 at the primary side 94 of the torsional vibration damper 90 which is supported axially with respect to a driven-side housing shell 147 by another axial bearing 144. On the drive side, the housing 30 is sealed with respect to the input hub 136 by means of the dynamic seal arrangement 120 on a comparatively smaller radius. The housing 30 and pump hub 36 thereof is sealed with respect to the transmission 10 on a somewhat greater radius by the dynamic seal 42.

The adjustment of vibration damping behavior can be carried out in this embodiment variant particularly by configuring the mass of the primary side 60 and secondary side 62 of the torsional vibration damper 58 and also by selecting the mass or mass moment of inertia of the supplementary mass in cooperation, of course, with the spring stiffness of the spring unit 64.

Figure 12:
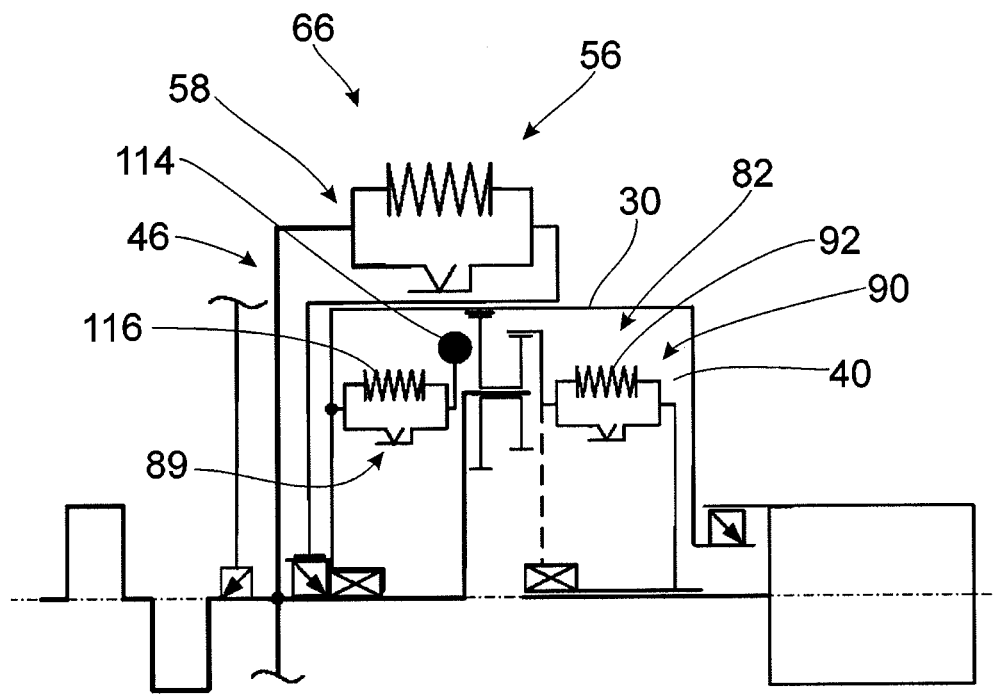
FIG. 12 is a view corresponding to FIG. 2 of an alternative embodiment.

FIG. 12 shows a further development of the embodiment shown in FIG. 10. Here, a vibration damping arrangement 89, in this case in the form of a fixed frequency mass damper as was described above with reference to FIG. 7, is provided additionally in the first torque transmission path 46. A flywheel mass 114 with one or more mass parts is connected to the housing 30 and provided in the interior 40 thereof by means of one or more springs 116 which are formed, for example, as helical compression springs or as elastomer blocks, for example, rubber elements or the like.

It is to be noted that the various aspects contributing to vibration damping such as, e.g., a plurality of torsional vibration dampers acting in series or in parallel in the oscillation system 66 and/or in the further oscillation system 90 in connection with one or more additional vibration damping arrangements in the embodiment forms described above can be provided regardless of whether parts of the system areas contributing to the vibration damping are arranged inside the housing 30 or outside the housing. In other words, all of the aspects mentioned above which contribute to the damping of torsional vibrations can be combined in any way. This applies equally to the embodiment of the coupling arrangement or planetary transmission arrangement thereof. The latter can be provided by ring gears or sun gears. It also goes without saying that the planet gears distributed in circumferential direction around the axis of rotation can be formed integral with the two sets of teeth 74, 76 or can be assembled in each instance from two parts, each of which provides one set of teeth.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement, comprising:
an input region;
an output region;
a first torque transmission path provided between the input region and the output region;

a second torque transmission path provided between the input region and the output region, and parallel to the first torque transmission path;

a coupling arrangement provided between the input region and the output region, said coupling arrangement being a planetary transmission arrangement constructed to superpose torques transmitted via the first and second torque transmission paths; and a phase shifter arrangement located at least in the first torque transmission path and constructed to generate a phase shift of rotational irregularities transmitted via the first torque transmission path relative to rotational irregularities transmitted via the second torque transmission path.

2. The torsional vibration damping arrangement according to claim 1, wherein the phase shifter arrangement includes a first oscillation system having a primary side and a secondary side which is rotatable relative to the primary side around an axis of rotation against a force of a spring arrangement.

3. The torsional vibration damping arrangement according to claim 2, wherein the output region includes a further oscillation system having a primary side and a secondary side which is rotatable relative to the primary side of the further oscillation system against an action of a further spring arrangement.

4. The torsional vibration damping arrangement according to claim 1, further comprising:

a housing arrangement which is rotatable around an axis of rotation, is fillable with a fluid, and surrounds at least the coupling arrangement.

5. The torsional vibration damping arrangement according to claim 4, wherein the housing arrangement surrounds at least a portion of the phase shifter arrangement.

6. The torsional vibration damping arrangement according to claim 5, wherein at least part of the phase shifter arrangement is arranged outside of the housing arrangement.

7. The torsional vibration damping arrangement according to claim 4, wherein a torque flow from the housing arrangement and the input region to a driven member cannot be interrupted.

8. The torsional vibration damping arrangement according to claim 7, wherein the driven member comprises a driven hub capable of coupling to a driven shaft, for common rotation around an axis of rotation.

9. The torsional vibration damping arrangement according to claim 8, wherein the driven shaft includes a transmission input shaft.

10. The torsional vibration damping arrangement according to claim 4, wherein the housing arrangement comprises a drive formation for driving a fluid pump for conveying fluid into the housing arrangement.

11. The torsional vibration damping arrangement according to claim 1, wherein the planetary transmission arrangement includes a planet gear carrier which is connected to the second torque transmission path and which has a plurality of planet gears rotatably supported thereon.

12. The torsional vibration damping arrangement according to claim 11, wherein the planetary transmission arrangement includes:

a first coupling gear arrangement in meshing engagement with the planet gears and connected to the first torque transmission path, and a second coupling gear arrangement in meshing engagement with the planet gears and connected to the output region.

13. The torsional vibration damping arrangement according to claim 12, wherein the first coupling gear arrangement in connection with the planet gears and the second coupling gear arrangement in connection with the planet gears provide transmission ratios that are identical to one another.

14. The torsional vibration damping arrangement according to claim 12, wherein the first coupling gear arrangement in connection with the planet gears and the second coupling gear arrangement in connection with the planet gears provide transmission ratios that are different from one another.

15. The torsional vibration damping arrangement according to claim 12, wherein each one of the first coupling gear arrangement and the second coupling gear arrangement comprises a respective ring gear arrangement.

16. The torsional vibration damping arrangement according to claim 12, wherein each one of the first coupling gear arrangement and the second coupling gear arrangement comprises a respective sun gear arrangement.

17. The torsional vibration damping arrangement according to claim 3, wherein at least one of the first oscillation system and the further oscillation system includes at least two vibration dampers arranged in series with one another, each of the at least two vibration dampers including a primary side and a secondary side which is rotatable relative to the primary side.

18. The torsional vibration damping arrangement according to claim 3, wherein at least one of the first oscillation system and the further oscillation system includes at least two vibration dampers working parallel with one another, and each of the at least two vibration dampers including a primary side and a secondary side which is rotatable relative to the primary side.

19. The torsional vibration damping arrangement according to claim 3, wherein at least one of the first oscillation system and the further oscillation system comprises a speed-adaptive vibration damping arrangement having at least one deflection mass which can be deflected in a circumferential direction from a basic position and which in so doing changes its distance from the axis of rotation.

20. The torsional vibration damping arrangement according to claim 3, wherein at least one of the first oscillation system and the further oscillation system includes a fixed-frequency vibration damping arrangement having at least one oscillation mass which can be deflected against an action of a return spring arrangement.

21. The torsional vibration damping arrangement according to claim 3, further comprising:

a friction damping arrangement associated with at least one of the first oscillation system and the further oscillation system, the friction damping arrangement opposing a relative rotation between the primary side and the secondary side of at least one of the first oscillation system and the further oscillation system.

22. The torsional vibration damping arrangement according to claim 1, wherein the torsional vibration damping arrangement is for a drivetrain with an automatic transmission.

23. A drivetrain for a vehicle, comprising:

an automatic transmission with a transmission input shaft and a torque flow interrupting arrangement internal to the transmission for selectively interrupting a torque transmission connection between the transmission input shaft and a transmission output shaft; and a torsional vibration damping arrangement according to claim 1, wherein the output region is coupled with the transmission input shaft region for common rotation.

* * * * *